(12) United States Patent
Mochizuki et al.

(10) Patent No.: US 7,639,452 B2
(45) Date of Patent: Dec. 29, 2009

(54) MAGNETIC HEAD FOR PERPENDICULAR RECORDING AND FABRICATION PROCESS

(75) Inventors: Masafumi Mochizuki, Tokyo (JP); Isao Nunokawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 351 days.

(21) Appl. No.: 11/370,504

(22) Filed: Mar. 7, 2006

(65) Prior Publication Data

US 2006/0198050 A1 Sep. 7, 2006

(30) Foreign Application Priority Data

Mar. 7, 2005 (JP) .............................. 2005-062746

(51) Int. Cl.
*G11B 5/127* (2006.01)

(52) U.S. Cl. .............................. 360/125.15; 360/125.08

(58) Field of Classification Search .................................
360/123.02–123.12, 125.02–125.3
See application file for complete search history.

(56) References Cited

U.S. PATENT DOCUMENTS

| 6,710,973 | B2 | 3/2004 | Okada et al. | |
|---|---|---|---|---|
| 7,253,992 | B2 * | 8/2007 | Chen et al. | 360/125.03 |
| 7,296,338 | B2 * | 11/2007 | Le et al. | 29/603.16 |
| 7,324,304 | B1 * | 1/2008 | Benakli et al. | 360/125.33 |
| 2002/0034043 | A1 * | 3/2002 | Okada et al. | 360/125 |
| 2002/0078553 | A1 | 6/2002 | Sato | |
| 2004/0047079 | A1 * | 3/2004 | Ito et al. | 360/317 |
| 2004/0150910 | A1 * | 8/2004 | Okada et al. | 360/125 |
| 2004/0150912 | A1 * | 8/2004 | Kawato et al. | 360/126 |
| 2004/0228033 | A1 * | 11/2004 | Aoki et al. | 360/126 |
| 2005/0044699 | A1 * | 3/2005 | Khera et al. | 29/603.12 |
| 2005/0068678 | A1 * | 3/2005 | Hsu et al. | 360/126 |
| 2005/0141137 | A1 * | 6/2005 | Okada et al. | 360/122 |
| 2005/0219743 | A1 * | 10/2005 | Guan et al. | 360/125 |
| 2005/0219747 | A1 * | 10/2005 | Hsu et al. | 360/126 |
| 2005/0237665 | A1 * | 10/2005 | Guan et al. | 360/125 |
| 2006/0002024 | A1 * | 1/2006 | Le et al. | 360/126 |
| 2006/0023352 | A1 * | 2/2006 | Le et al. | 360/125 |

FOREIGN PATENT DOCUMENTS

WO  WO 9009658 A1 * 8/1990

* cited by examiner

*Primary Examiner*—William J Klimowicz
(74) *Attorney, Agent, or Firm*—Townsend and Townsend and Crew LLP; Rambod Nader

(57) ABSTRACT

Embodiments of the invention provide an easy-to-fabricate magnetic head which can generate a high magnetic field without eliminating adjacent tracks even if a skew angle is created. In one embodiment, a structure which comprises a pole tip of main pole exposed on the air bearing surface, a part which is recessed from the air bearing surface and having a tapered face at leading side against the air bearing surface, and a magnetic material connected thereto is adopted for the main pole.

5 Claims, 20 Drawing Sheets

Fig.21
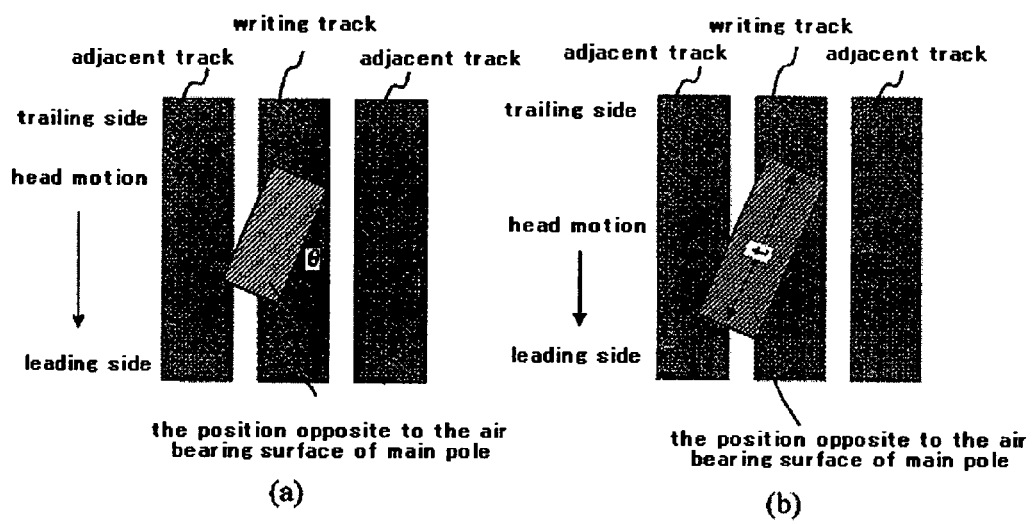
(a)    (b)
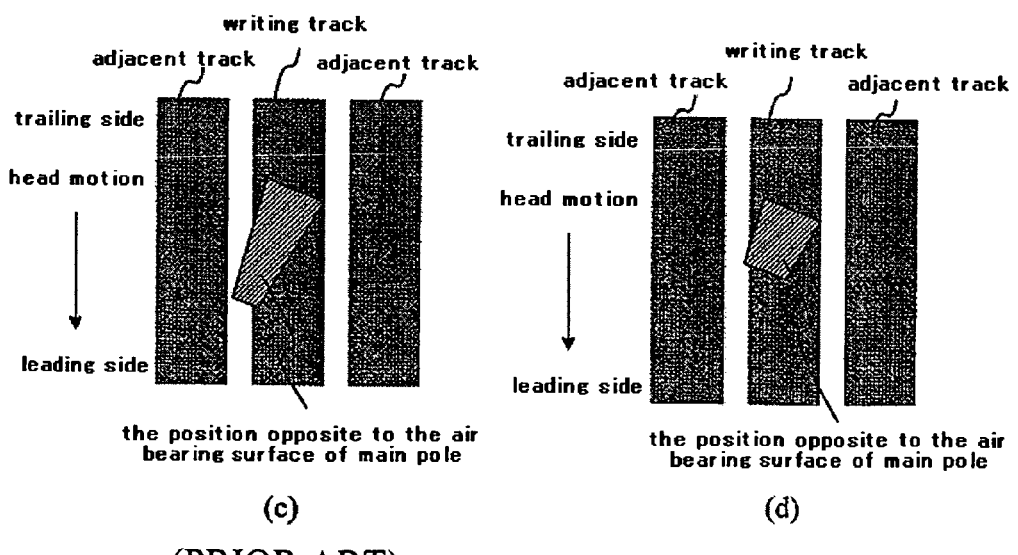
(c)    (d)
(PRIOR ART)

MAGNETIC HEAD FOR PERPENDICULAR RECORDING AND FABRICATION PROCESS

CROSS-REFERENCES TO RELATED APPLICATIONS

This application claims priority from Japanese Patent Application No. JP2005-062746, filed Mar. 7, 2005, the entire disclosure of which is incorporated herein by reference.

BACKGROUND OF THE INVENTION

The present invention relates to a magnetic head for a perpendicular recording system and a fabrication process thereof.

A magnetic recording system has a magnetic recording medium and a magnetic head, and data in the magnetic recording medium are read/written by using a magnetic head. It is necessary to reduce a recorded bit for improving the recording capacity per unit area of the magnetic recording medium. However, in a current longitudinal recording system, there is the problem that the recording density cannot be improved because of a thermal fluctuation of magnetization of the medium when the recorded bit length becomes smaller. As a solution of this problem, there is a perpendicular recording system, in which the magnetization signal is recorded along the perpendicular direction in the medium. There are two kinds of methods in a perpendicular recording system. One is a method in which a double-layered perpendicular medium has a soft under layer as the recording medium, and another is a method in which a single-layered perpendicular medium has no soft under layer. In the case when the double-layered perpendicular medium is used as the recording medium, larger write-field intensity can be applied by using a so-called single-pole-type writer which has a main pole and an auxiliary pole.

FIG. 19 is a schematic drawing illustrating a relationship between a perpendicular magnetic recording head 14 and a magnetic disk 11 and perpendicular recording. The magnetic field generated from a main pole 1 of a write head 25 passes through a magnetic recording layer 19 and a soft under layer 20 of the magnetic disk medium 11, forms a magnetic circuit entering an auxiliary pole 3, and records a magnetization pattern in a magnetic recording layer 19. There is a case in which an intermediate layer is formed between the magnetic recording layer 19 and the soft under layer 20. A giant magneto resistive element (GMR) or a tunneling magneto resistive element (TMR) are used for a read element 7 of a read head 24. It is preferable that the shape of the air bearing surface of the main pole is made in a trapezoidal shape in which the width at the leading side is smaller, considering the case when the head has a skew angle. A magnetic head of the prior art consists of laminating a lower shield 8, a read element 7, an upper shield 9, an auxiliary pole 3, a thin film coil 2, and a main pole 1, in order, from the head motion side (leading side). The read head 24 is composed of the lower shield 8, the read element 7, and the upper shield 9, and the write head (single-pole-type writer) 25 is composed of the auxiliary pole 3, the thin film coil 2, and the main pole 1. The main pole 1 consists of a yoke part of main pole 1A connected to the auxiliary pole through the pillar 17 and a pole tip of main pole 1C which is exposed on the air bearing surface and determines the track width.

Moreover, since an auxiliary pole and a thin film coil exist between the read element and the main pole in the structure shown in FIG. 19, there is a disadvantage that the distance between the write element and the read element becomes greater and the format efficiency is deteriorated. Therefore, a structure, in which the auxiliary pole 3 is placed on the trailing side of the main pole 1, is to be applied as shown in FIG. 20. Because of this structure, it becomes possible to make the distance between the write element and the read element smaller.

Moreover, the magnetic field gradient of the perpendicular component profile of the head magnetic field which determines the transition of the recorded bit cell as well as the intensity of the write head magnetic field, which means the magnetic field gradient in the perpendicular component profile of the head magnetic field along the head motion, is also an important factor to achieving a high recording density. In order to achieve a higher recording density, it is necessary to make the magnetic field gradient greater in the future. There is a structure to improve the write field gradients, in which a magnetic material 32 is arranged on the trailing side of the main pole 1. In this structure, there is a case where the auxiliary pole 3 is arranged at the trailing side of the main pole 1 to make a closed magnetic circuit as shown in FIG. 20.

A magnetic head is usually fabricated by laminating a magnetic film, in order, on a substrate by using a sputtering method and a plating method. Therefore, a structure of the prior art is one in which the face of the main pole at the leading side is parallel to the substrate and perpendicular to the air bearing surface. A perpendicular recording head, in which a taper is formed at the pole tip of the main pole from the air bearing surface, is disclosed in patent document 1 (JP-A No. 133610/2002).

BRIEF SUMMARY OF THE INVENTION

The present invention relates to a perpendicular recording system which uses a perpendicular recording head having a main pole and an auxiliary pole and a double-layered perpendicular recording medium having a soft under layer. Even in a perpendicular recording, a magnetic layer having a large coercivity has to be used for the recording layer to allow it to have a high recording density. Therefore, it is necessary to increase the write-field intensity applied to the recording layer. One of the methods for increasing the write-field intensity is to make the distance between the soft under layer and the write head smaller. However, a certain amount of thickness of the recording layer is required to improve the resistance to demagnetization caused by the thermal fluctuation. Moreover, there are factors which impede reducing the distance between the soft under layer and the head, such as the flatness of the surface of the recording layer, lubricant, and the existence of a protection layer for the head. Another method is the one where the film thickness of the head main pole is increased. It is possible to increase the intensity of the magnetic field by increasing the film thickness of the head main pole and increasing the area of the air bearing surface of the main pole, even if the track width is the same. However, in the case when a skew angle is created by increasing the film thickness of the head main pole, a greater magnetic field is applied to the adjacent tracks.

In a magnetic disk system, a suspension arm to which is fixed a head slider is scanned from the inside to the outside of the recording medium to perform read/write. Therefore, as shown in FIG. 21(*a*), the head has different angles against the recording track depending on the positions of the recording medium. This is the skew angle. The write-field intensity of a double-layered perpendicular medium system is distributed corresponding to the opposite side of the head main pole. As shown in FIG. 21(*b*), in the case when the film thickness of the head main pole is increased, the opposite side of the air bearing surface of the head main pole is brought close to the adjacent tracks, resulting in a stronger magnetic field being applied to the adjacent tracks. As a result, attenuation or elimination of the adjacent tracks' data occurs. In the prior art, as shown in FIG. 21(c), there is a technique in which the shape of the air bearing surface of the main pole is made in a trapezoidal shape with the width at the leading side being smaller, considering the case when the write head has a skew angle.

According to the above explanation, it is necessary, for making a high recording density, that a greater magnetic field intensity be applied without attenuating or eliminating the adjacent tracks' data even in the case when the write head has a skew angle. This is a problem to be solved to achieve a much higher recording density in a magnetic disk system using a perpendicular recording.

Furthermore, in order to improve the recording density, it is necessary to improve the track density and the liner recording density even in a perpendicular recording. However, it is necessary to make the track width of the magnetic head narrower, in order to improve the track density. A magnetic field emitted from the remanent magnetization of the main pole while applying no recording current becomes greater with making the track narrower. A problem arises that the recorded information in the perpendicular recording medium is eliminated when the magnetic field emitted from the remanent magnetization becomes greater. These become serious issues when a high recording density is achieved.

It is a feature of the present invention to provide a perpendicular recording magnetic head and a fabrication method thereof, in which the recorded information in the perpendicular recording medium is not eliminated even if the track is made narrower and a high magnetic field intensity can be generated without attenuating or eliminating the adjacent tracks' data even in the case when the head has a skew angle. Specifically, it is a feature of the present invention to provide a magnetic disk system in which the perpendicular recording magnetic head is mounted.

A magnetic head of the present invention is a magnetic head for a perpendicular recording system having a main pole and an auxiliary pole in which the main pole has a yoke part and a pole tip. The pole tip includes a first section having a predetermined film thickness in which the tip is exposed at an air bearing surface, and a second section which is located above the first section in the back part of the element-height direction and has an area where a face at the leading side is inclined against the air bearing surface and the film thickness is gradually increased toward the back part of the element-height direction. More preferable is that a non-magnetic layer be provided between the first section and the second section.

According to the structure of an embodiment of the present invention, high write-field intensity can be generated even if the width of the magnetic field distribution along the head motion is small, and no attenuation and elimination of data occurs in the adjacent tracks even if the head has a skew angle. Herein, the air bearing surface means the surface opposite a medium of the magnetic film constituting the head except the protection film of a non-magnetic material such as carbon.

According to the present invention, a write head and a magnetic disk system mounting it can be provided, in which data erasure caused by the magnetic fields emitted from the remanent magnetization of the main pole while applying no recording current does not occur, and a high write-field intensity can be generated without attenuating or erasing the adjacent tracks' data even in the case when the head has a skew angle.

BRIEF DESCRIPTION OF THE DRAWINGS

FIGS. 21(a)-(d) are schematic drawings illustrating examples of skew angle and the position to the air bearing surface of main pole.

DETAILED DESCRIPTION OF THE INVENTION

Hereinafter, specific embodiments of the present invention will be described with reference to the accompanying drawings as follows. In each of the following drawings, the same functional part will be shown using the same code to make understanding easier.

Figure 5:
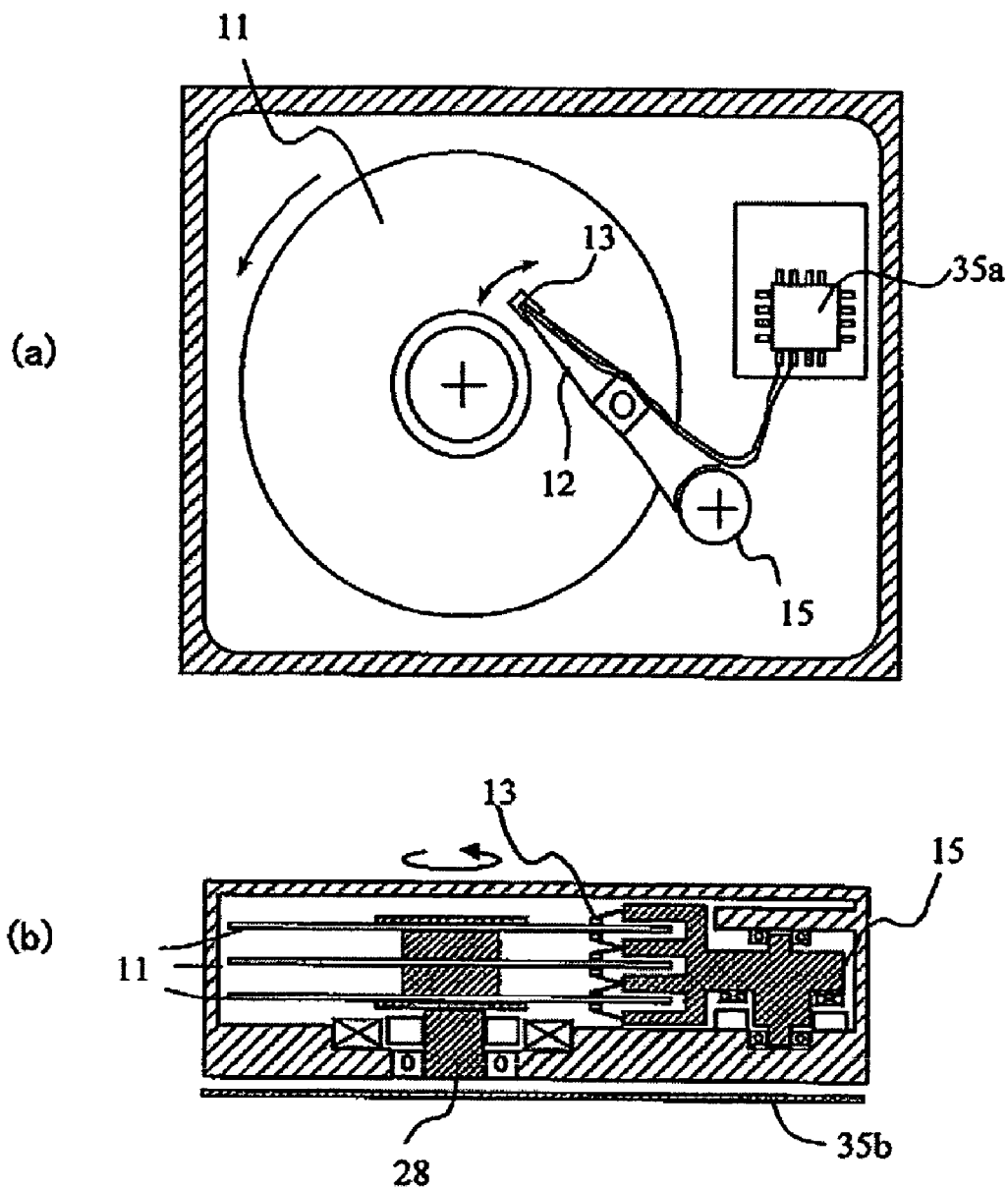
FIGS. 5(a)-(b) are schematic drawings showing one example of a magnetic recording system.

FIG. 5 is a schematic illustration showing an example of a magnetic recording system of the present invention. The magnetic recording system reads/writes the magnetization signals by the magnetic head mounted on the slider 13 fixed at the tip of the suspension arm 12 at the predetermined position on the magnetic disk (magnetic recording medium) 11 being rotated by the motor 28. The position in the magnetic disk radial direction of the magnetic head (track) can be selected by driving the rotary actuator 15. The recording signals to the magnetic head and the reading signals from the magnetic head are processed in the signal processing circuits 35a and 35b.

Figure 1:
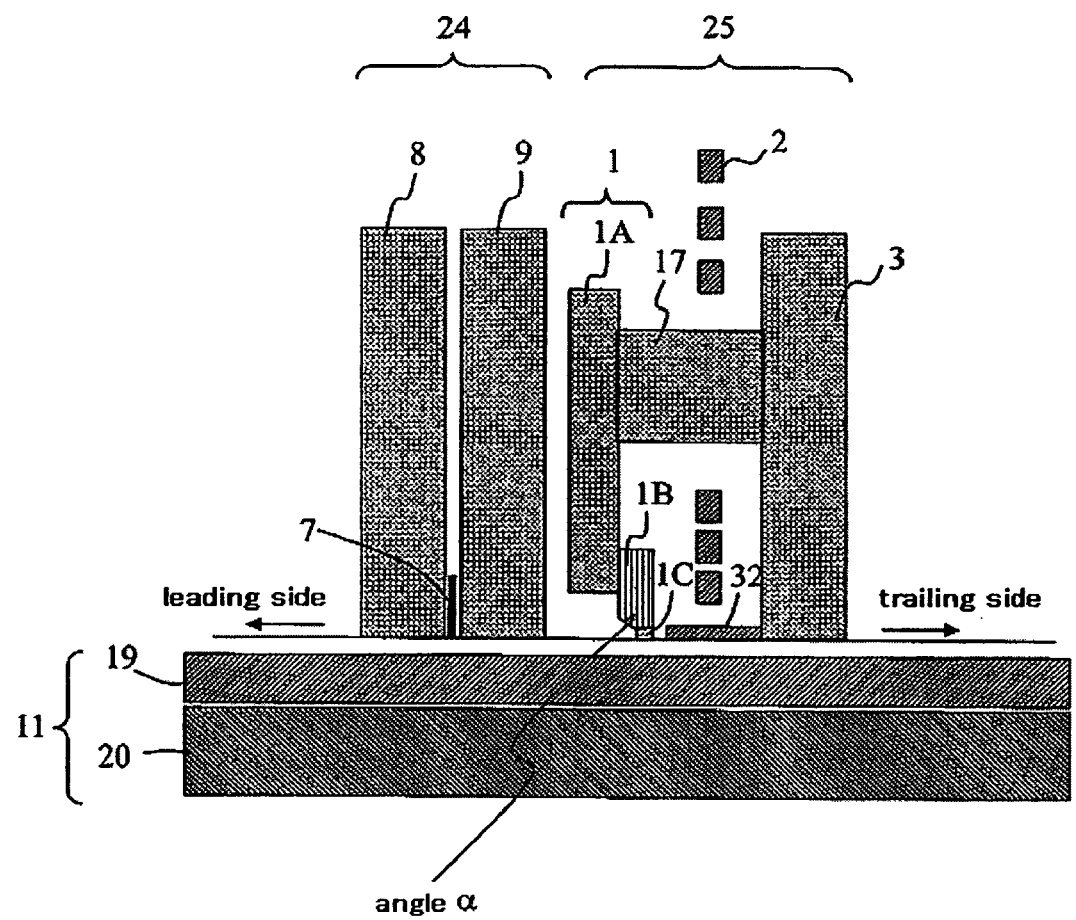
FIG. 1 is a cross-sectional schematic drawing at the track center illustrating an example of a magnetic head of the present invention.
Figure 2:
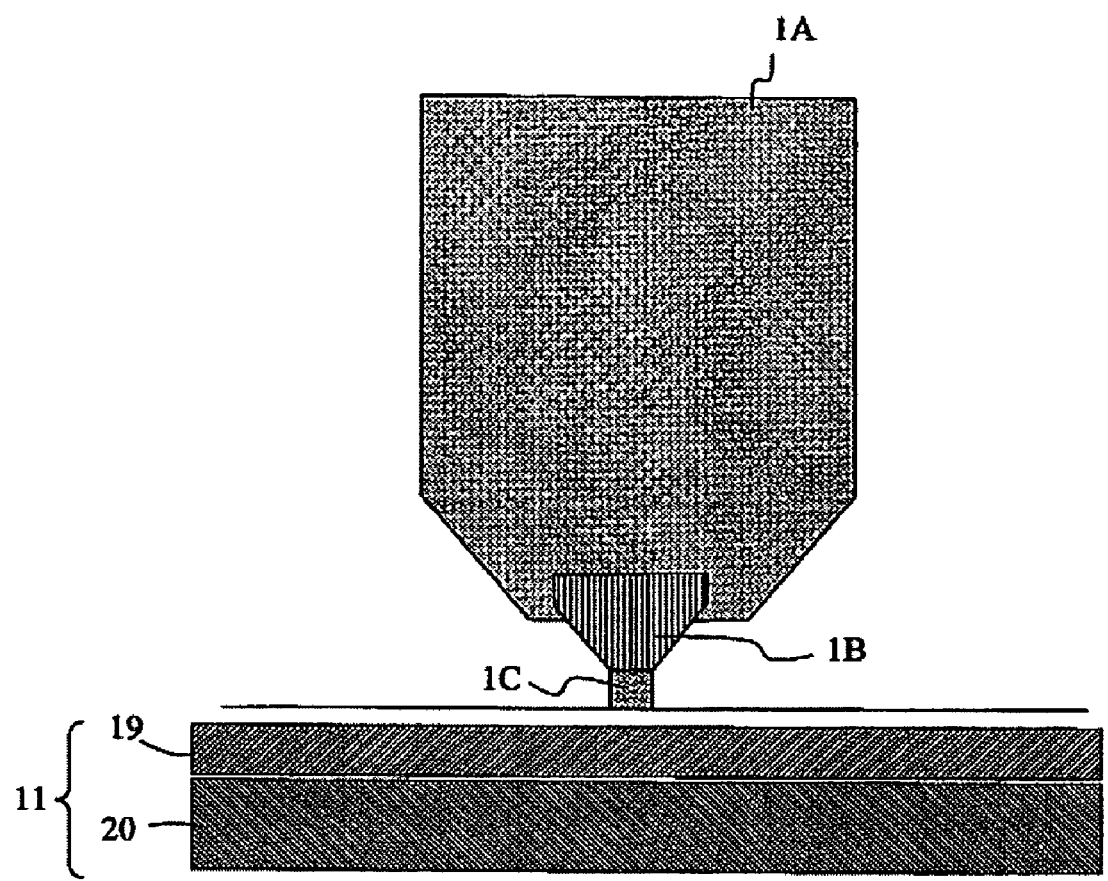
FIG. 2 is a top plan view schematic drawing illustrating an example of a main pole of a magnetic head as seen from the trailing direction.

FIG. 1 is a cross-sectional schematic drawing at the track center illustrating an example of a magnetic head of the present invention. FIG. 2 is a schematic structural drawing illustrating a main pole of the magnetic head shown in FIG. 1 as seen from the trailing side. A cross-sectional schematic drawing of a magnetic recording medium 11 is also shown in the figure.

This magnetic head is a read/write merged head having a write head 25 providing the main pole 1 and the auxiliary pole 3, and a read head 24 providing the read element 7. The main pole 1 is magnetically connected to the auxiliary pole 3 by the pillar 17 at the position spaced from the air bearing surface, and the thin film coil 2 is interlinked to the magnetic circuit consisting of the main pole 1, the auxiliary pole 3, and the pillar 17. The main pole 1 is placed at the leading side of the auxiliary pole 3. The main pole 1 consists of the yoke part of main pole 1A connected to the auxiliary pole 3 by the pillar 17, the pole tip of main pole 1C exposed on the air bearing surface and providing the track width, and the part 1B placed between them which is recessed from the air bearing surface. The part 1B which is recessed from the air bearing surface has a taper, which becomes smaller toward the air baring surface at the leading side. That is, the main pole of the magnetic head of the present invention has a sloping structure (tapered structure with a tapered angle of α), in which the film thickness is gradually increased at the face of the leading side toward the inner side of the element-height direction (herein, the perpendicular direction on the paper of the magnetic head shown in FIG. 1 is called the element-height direction) from the position which is recessed from the air bearing surface. The read element 7 consisting of a giant magneto resistive element (GMR) and a tunneling magneto resistive element (TMR), etc. is placed between a pair of magnetic shields (reading shields) constituting the lower shield 8 at the leading side and the upper shield 9 at the trailing side.

Figure 3:
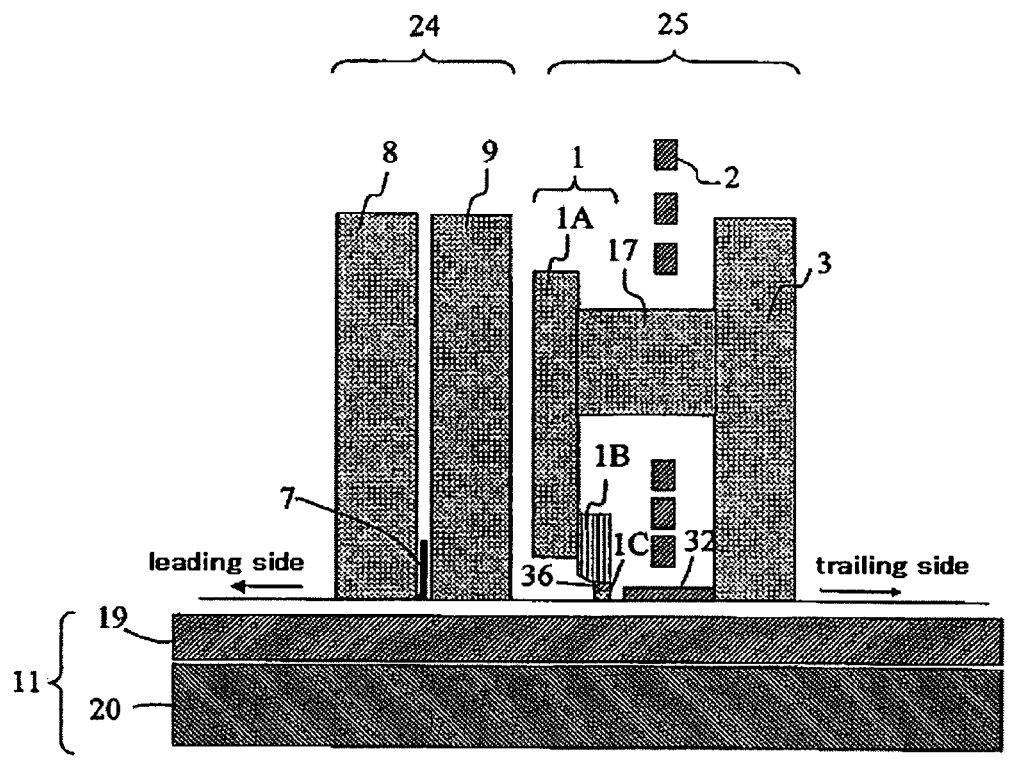
FIG. 3 is a cross-sectional schematic drawing illustrating another example of a magnetic head of the present invention.
Figure 4:
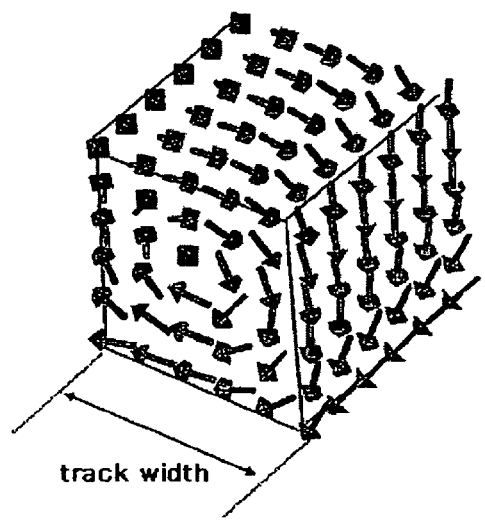
FIG. 4 is a schematic drawing illustrating a remanent magnetization state at a main pole tip.

FIG. 3 is a cross-sectional schematic drawing illustrating an example of a preferable structure of a magnetic head of the present invention. In the magnetic head, a non-magnetic layer 36 lies between the pole tip of main pole 1C exposed on the air bearing surface of the main pole and the part 1B having a taper at the leading side. In a perpendicular recording system using a double-layered perpendicular medium which has a soft under layer, a magnetic field emitted from the remanent magnetization of the main pole while applying no recording current becomes greater. A problem (erasure problem after recording) arises that the recorded data in the perpendicular recording medium are eliminated when the magnetic field emitted from the remanent magnetization becomes greater. These will be serious obstacles when high density recording is achieved. In the case when the structure shown in FIG. 3 is taken, the face of the pole tip of main pole 1C, which is exposed on the air bearing surface, at the side of the part 1B having a tapered face at the leading side becomes an end face so that the magnetization in the pole tip of main pole 1C exposed on the air bearing surface can be easily returned parallel to the air bearing surface, resulting in the vertical component of the remanent magnetization being smaller. FIG. 4 is a schematic drawing illustrating the magnetization state only of the pole tip of main pole of the magnetic head of the present invention. The arrows show the direction of the magnetization. Such a state can be created and the perpendicular component of the remanent magnetization becomes smaller, resulting in the magnetic field emitted from the remanent magnetization being reduced. In this way, the elimination problem after recording can be solved. According to a three-dimensional magnetic field calculation of the write-field intensity which is done by the inventors, the decrease of the write-field intensity is about $1.6 \times 10^5$ A/m in the case when the thickness of the non-magnetic layer 36 is 20 nm, which is smaller than the increase of the magnetic field intensity by the structure of the present embodiment. Therefore, introducing a non-magnetic film 36 in a structure of the present invention can let the write-field intensity increase over that of the prior art and solve the elimination phenomena after recording. Herein, it is not preferable that the length of the pole tip of main pole 1C in the element-height direction be oriented in the perpendicular direction against the medium, and it is preferable that the length be smaller than the width of pole tip of the main pole 1C exposed on the air bearing surface in the track-width direction.

Figure 6:
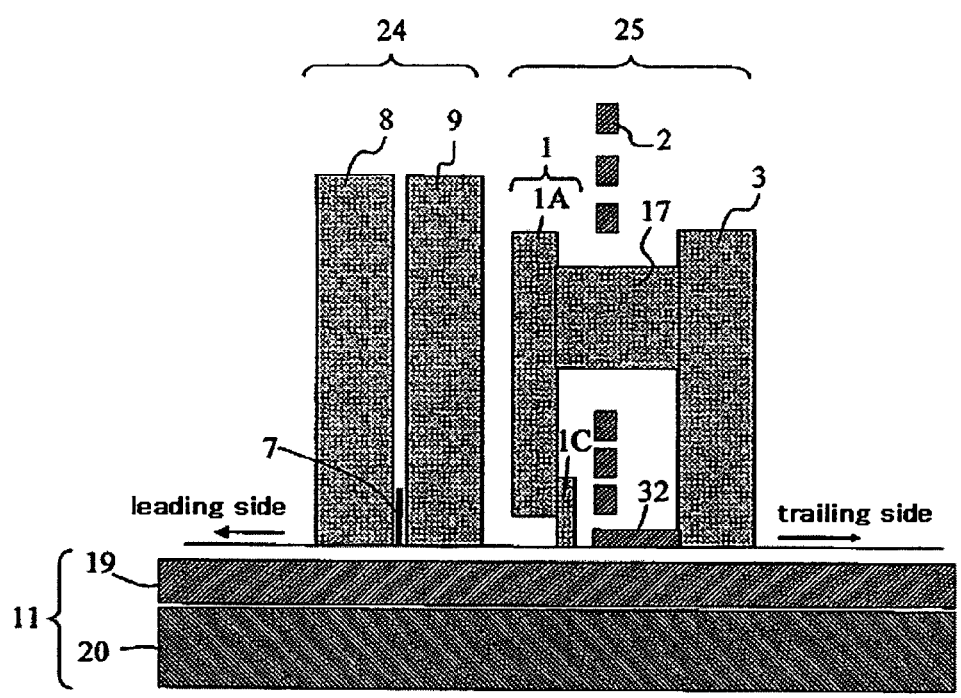
FIG. 6 is a cross-sectional schematic drawing at the track center illustrating a comparative example of a magnetic head.
Figure 7:
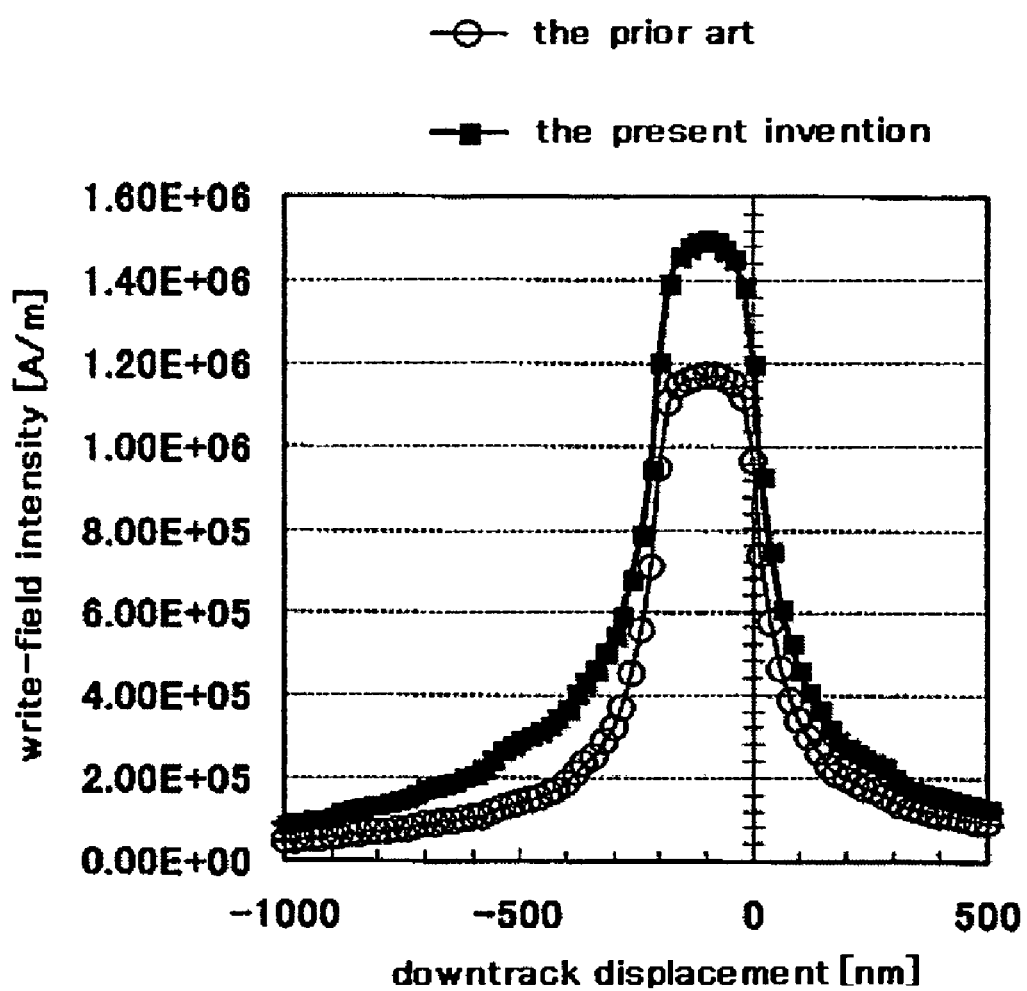
FIG. 7 is a figure showing a comparison of write-field intensity distributions along the head motion at the track center of the magnetic heads of the present invention and of an embodiment.

Write-field intensities generated by the main poles were calculated by using a three-dimensional magnetic field calculation for the magnetic head of the present invention shown in FIG. 1 and the magnetic head of comparative example shown in FIG. 6. The results are shown in FIG. 7.

The assumptions of the calculation are as follows. The dimensions of the pole tip of main pole 1C which provides the track width of the main pole of the magnetic head of the present invention shown in FIG. 1 are assumed to be 120 nm in width and 200 nm in thickness. The film thickness of the part 1B which has a tapered face at the leading side is assumed to be 200 nm thick in the thinnest part at the tip of the taper and 400 nm thick at the end part of the taper. The taper is provided to the part having a thickness of 200 nm, which is half the film thickness. Moreover, the tapered angle α of the taper provided at the leading side is assumed to be 45°. The taper is provided from the position 100 nm recessed from the air bearing surface toward the back side in the element-height direction. The shape of the air bearing surface of the main pole is a trapezoidal shape in which the width at the trailing side is wider. That is, the width of the pole tip of main pole 1C at the leading side becomes narrower by an angle of 8° toward the leading side.

Moreover, in the schematic structural drawing of the main pole shown in FIG. 2 as viewed from the trailing side, the flare angle of the width of the part 1B having a taper at the leading side is assumed to be 90° from the position drawn at the border of the part 1B having a taper at the leading side and the pole tip of main pole 1C. Assuming CoNiFe to be the material for the parts of main pole 1B and 1C, the saturation magnetic flux density and the relative permeability were assumed to be 2.4 T and 500, respectively. 80 at % Ni-20 at % Fe with a saturation magnetic flux density of 1.0 T is assumed for the yoke part of main pole 1A. A material with a saturation magnetic flux density of 1.0 T is assumed for the auxiliary pole 3, and the dimensions were 30 μm wide in the track-width direction, 16 μm long in the element-height direction, and a film thickness of 2 μm. 80 at % Ni-20 at % Fe with a saturation magnetic flux density of 1.0 T is assumed for the upper shield 9 and the lower shield 8, and the dimensions were 32 μm wide in the track-width direction, 16 μm long in the element-height direction, and a film thickness of 1.5 μm. The magnetic material 32 was omitted in order to simplify the calculation. CoTaZr is assumed for the material for the soft under layer 20 of the magnetic recording medium, and the distance from the air bearing surface to the surface of the soft under layer 20 and the thickness of the lining layer were 40 nm and 150 nm, respectively. The write-field intensity was calculated at the position assuming that the center position of the magnetic recording layer was a distance of 25 nm from the air bearing surface. Only a film thickness of 20 nm for the medium recording layer was considered and the magnetization properties were not considered.

The calculation was carried out for the magnetic head of the comparative example shown in FIG. 6 using the same conditions of the shape and the material as the magnetic head shown in FIG. 1 except for the shape of the pole tip of the main pole. It is assumed that the main pole does not have the part 1B having a tapered face at the leading side, and the pole tip of main pole 1C, which provides the track width, was directly connected to the yoke part of main pole 1A. The width and the film thickness of the pole tip of main pole 1C which provides the track width of the main pole were assumed to be 120 nm and 200 nm, respectively.

In FIG. 7, the horizontal axis shows the distance along the head motion, and the origin of the horizontal axis corresponds to the trailing edge position of the main pole. In the case of this condition, according to the magnetic head of the present invention, the write-field intensity can increase by about $3.00 \times 10^5$ A/m, resulting in a high recording density being achieved.

Figure 8:
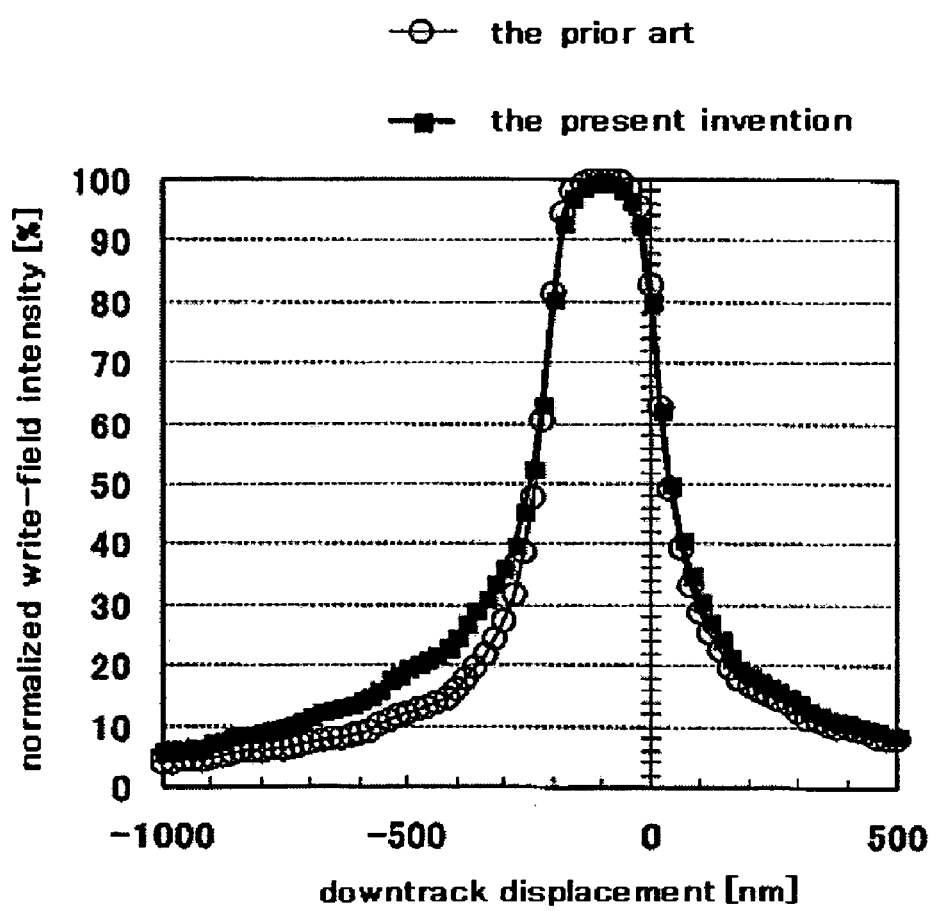
FIG. 8 is a figure showing a comparison of normalized write-field intensity distributions along the head motion at the track center of the magnetic heads of the present invention and of an embodiment.

FIG. 8 is a drawing illustrating a profile along the head motion normalized by each maximum magnetic field intensity. According to the magnetic head having a shape of the main pole of the present invention, the width of the magnetic field along the head motion does not extend to the point where the magnetic field intensity is large, so that it is possible to control the data erasure of the adjacent tracks even if a head has a skew angle. The shape of the main pole of the present invention is excellent in controlling the width of the magnetic field because a taper is not provided at the part exposed on the air bearing surface.

Figure 9:
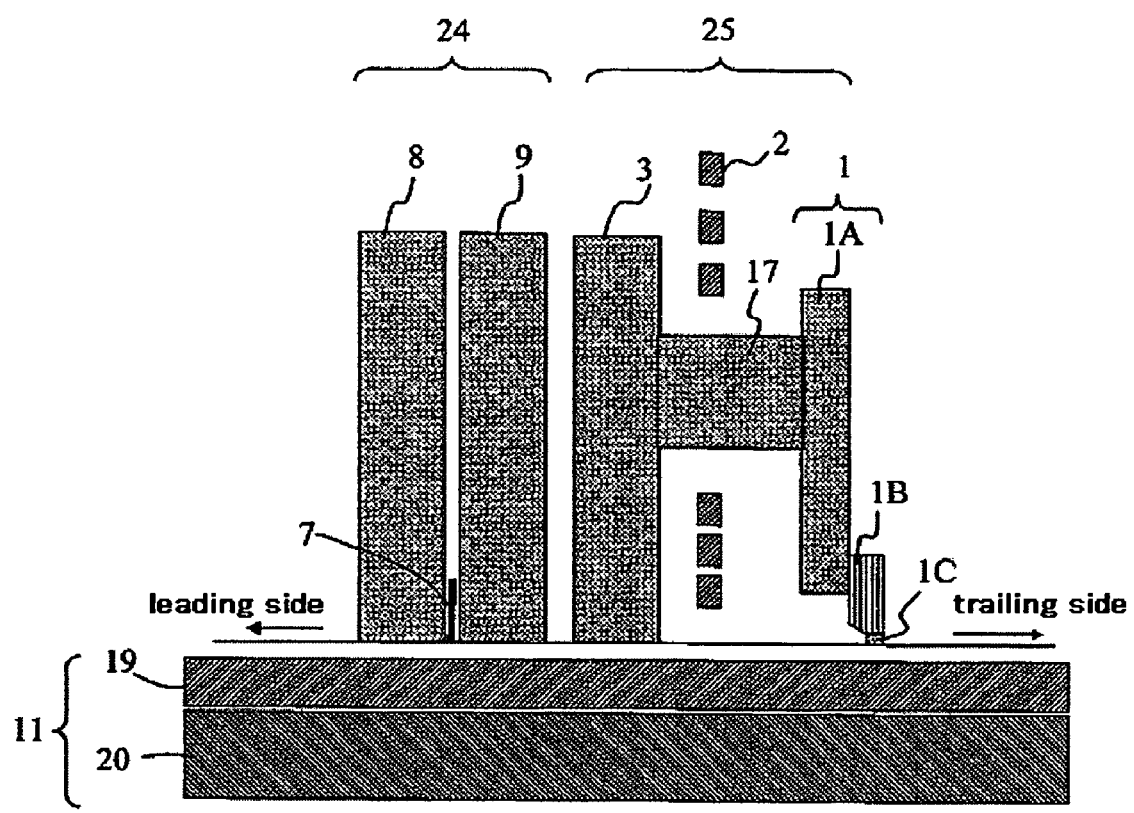
FIG. 9 is a cross-sectional schematic drawing at the track center illustrating another embodiment of a magnetic head.
Figure 10:
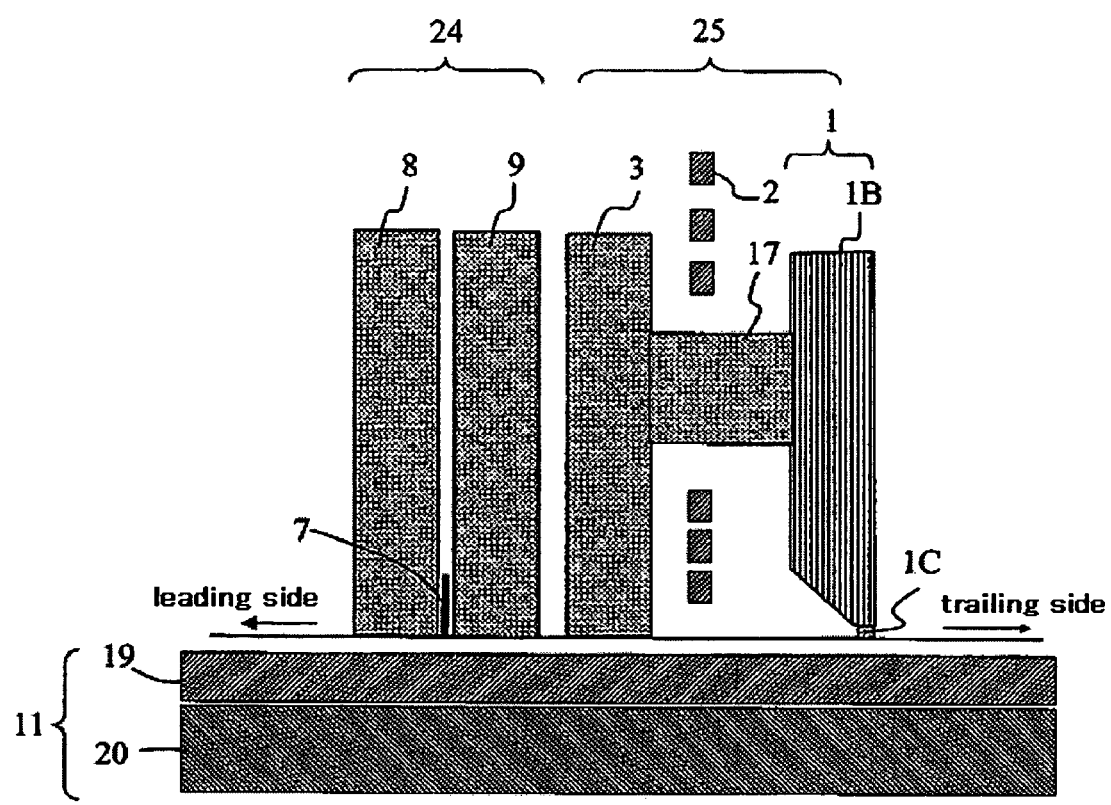
FIG. 10 is a cross-sectional schematic drawing of another embodiment of a magnetic head.

The present invention is effective even if it is applied to the magnetic head in which the main pole 1 is placed at the trailing side of auxiliary pole 3 as shown in FIG. 9. Moreover, as shown in FIG. 10, the effect of the present invention can be obtained even if the part 1B having a tapered face at the leading side is directly connected to the auxiliary pole 3 through the pillar 17.

Figure 11:
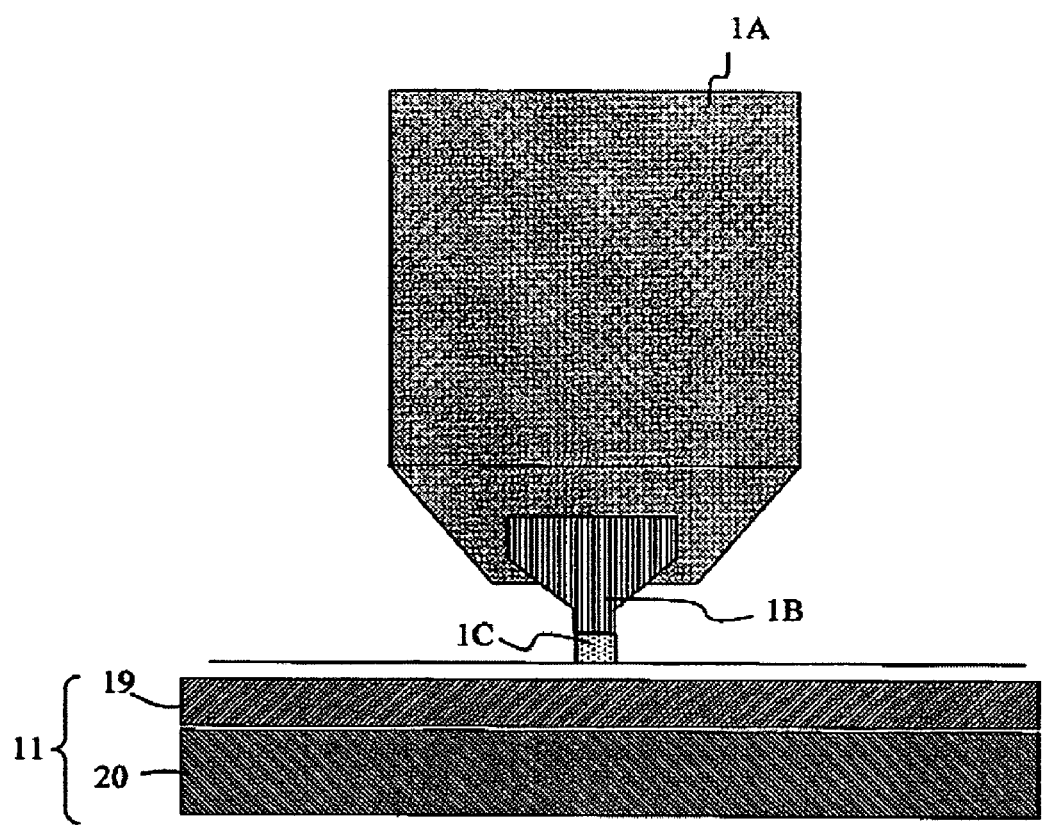
FIG. 11 is a top plan view schematic drawing illustrating another example of a main pole of a magnetic head as seen from the trailing direction.

FIG. 11 is a drawing illustrating another embodiment of the present invention. In this embodiment, a vertical part perpendicular to the track-width direction is provided in a part 1B having a tapered face at the leading side, forming the part drawn. It is possible to make the width of the write-field intensity distribution in the track-width direction narrower because of such a structure. As a result, side writing in the recording medium can be made more reduced.

Figure 12:
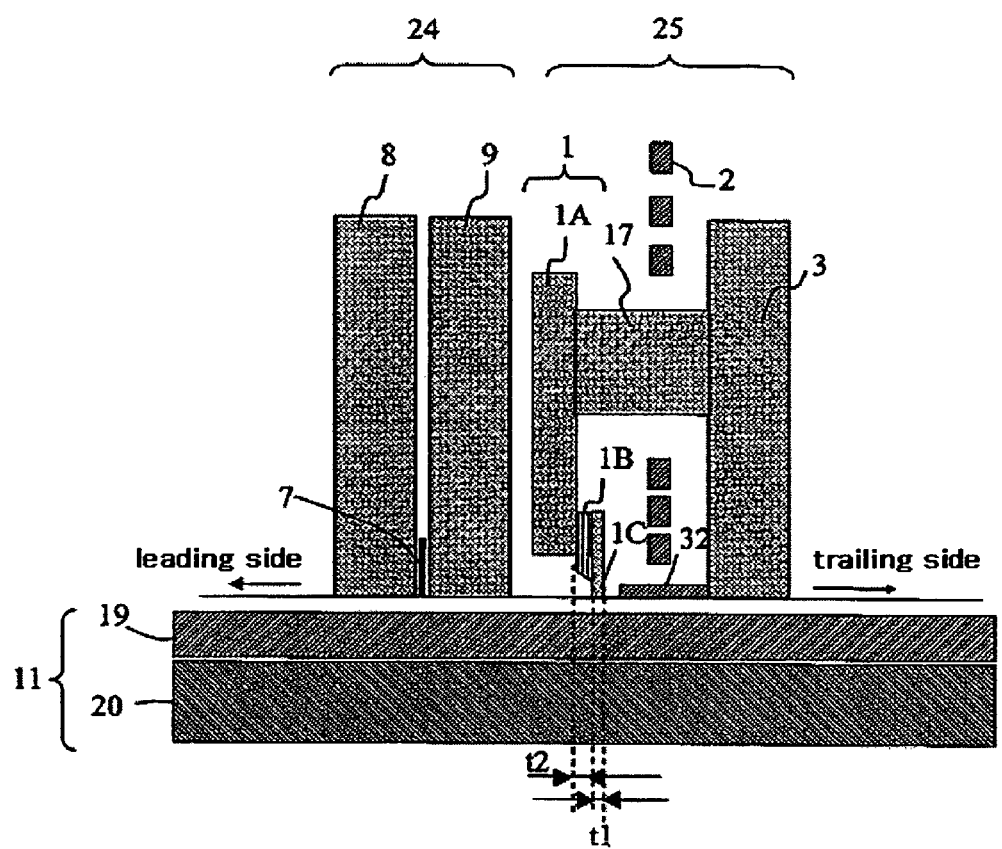
FIG. 12 is a cross-sectional schematic drawing at the track center illustrating another embodiment of a magnetic head.

Moreover, in the present invention, the pole tip of main pole 1C exposed on the air bearing surface of the main pole may be extended to the same position as the part 1B having a tapered face at the leading side in the element-height direction, as shown in FIG. 12.

According to the present invention, the area of the magnetic pole exposed on the air bearing surface can be made smaller to obtain the same maximum magnetic field intensity as a conventional structure. That is, the structure of a head of the present invention can achieve a high magnetic field intensity even if the magnetic field width along the head motion is narrow. Therefore, even if a head has a skew angle, it is possible to control the side writing and the data erasure of adjacent tracks.

Figure 13:
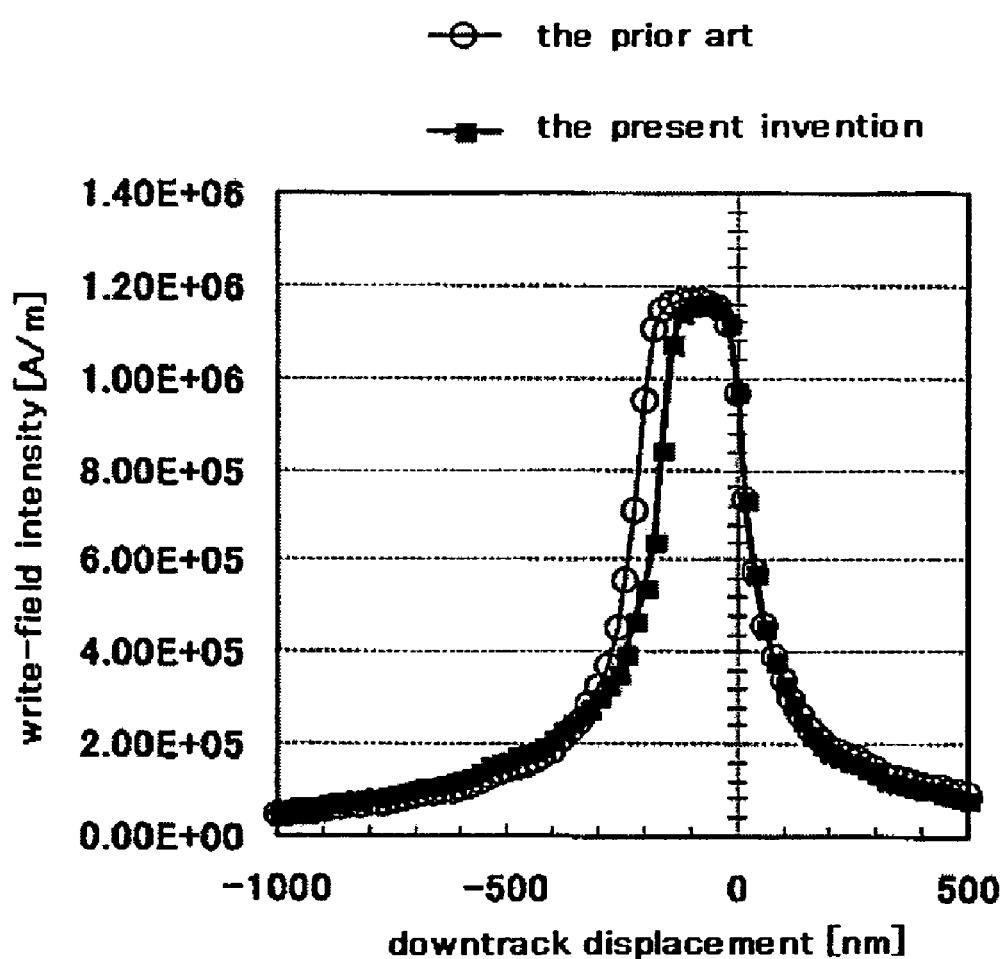
FIG. 13 is figure showing a write-field intensity distribution along the head motion at the track center of a magnetic head of the present invention.

FIG. 13 shows profiles of the write-field intensity along the head motion in the case when the area of the main pole exposed on the air bearing surface was made to be ¾ that of a conventional structure. In this calculation, the dimensions of the pole tip of main pole 1C which provide the track width of the main pole of the magnetic head of the present invention shown in FIG. 1 is assumed to be 120 nm in width and 200 nm in thickness. The thickness of the part 1B having a tapered face at the leading side is assumed to be 200 nm at the part having no tapered face at the inner side in the element-height direction. The tapered angle α of the tapered face at the reading side is assumed to be 45°. The taper is provided from a position 100 nm which is recessed from the air bearing surface toward the inner side in the element-height direction. The shape of the air bearing surface of the main pole is a trapezoidal shape in which the width on the trailing side is wider. That is, the width of the pole tip of main pole 1C at the leading side becomes narrower with an angle of 8° toward the leading side. Assuming CoNiFe to be the material for the main poles 1B and 1C, the saturation magnetic flux density and the relative permeability were assumed to be 2.4 T and 500, respectively. 80 at % Ni-20 at % Fe with a saturation magnetic flux density of 1.0 T is assumed for the yoke part of the main pole 1A. A material with a saturation magnetic flux density of 1.0 T is assumed for the auxiliary pole 3, and the dimensions were 30 µm wide in the track-width direction, 16 µm long in the element-height direction, and a film thickness of 2 µm. 80 at % Ni-20 at % Fe with a saturation magnetic flux density of 1.0 T is assumed for the upper shield 9 and the lower shield 8, and the dimensions were 32 µm wide in the track-width direction, 16 µm long in the element-height direction, and a film thickness of 1.5 µm. CoTaZr is assumed for the material for the soft under layer 20 of the magnetic recording medium, and the distance from the air bearing surface to the surface of the soft under layer 20 and the thickness of the soft under layer were 40 nm and 150 nm, respectively. The write-field intensity was calculated at the position assuming that the center position of the magnetic recording layer was a distance of 25 nm from the air bearing surface.

The calculation was carried out for the magnetic head of the comparative example shown in FIG. 6 using the same conditions of the shape and the material as the magnetic head shown in FIG. 1 except for the shape of the pole tip of the main pole. It is assumed that the main pole does not have the part 1B having a tapered face at the leading side, and the pole tip of main pole 1C, which provides the track width, was directly connected to the yoke part of main pole 1A. In the magnetic head of the comparative example, the width and the film thickness of the pole tip of main pole 1C providing the track width of the main pole are assumed to be 120 nm and 200 nm, respectively.

According to FIG. 13, although the same maximum magnetic field intensity can be obtained in both magnetic heads of the present invention and the comparative example, the width of the magnetic field distribution becomes narrower in the structure of the present invention. Because the film thickness can be made smaller, the distance from the position opposite to the air bearing surface of the main pole to the adjacent tracks becomes longer as shown in FIG. 21(d). Therefore, the magnetic field applied to the adjacent tracks can be reduced even if the head has a skew angle in the magnetic recording system, resulting in a high recording density being achieved. Moreover, since a high magnetic field can be generated in the structure of the main pole of the present invention, the same magnetic field intensity as a conventional structure can be obtained even if the applied current to the write coil is small. Therefore, the calorific value is suppressed since the applied current to the write coil can be small, and the deformation due to the thermal expansion of the magnetic material of the head can be suppressed, resulting in a steady low flying height being achieved.

Figure 14:
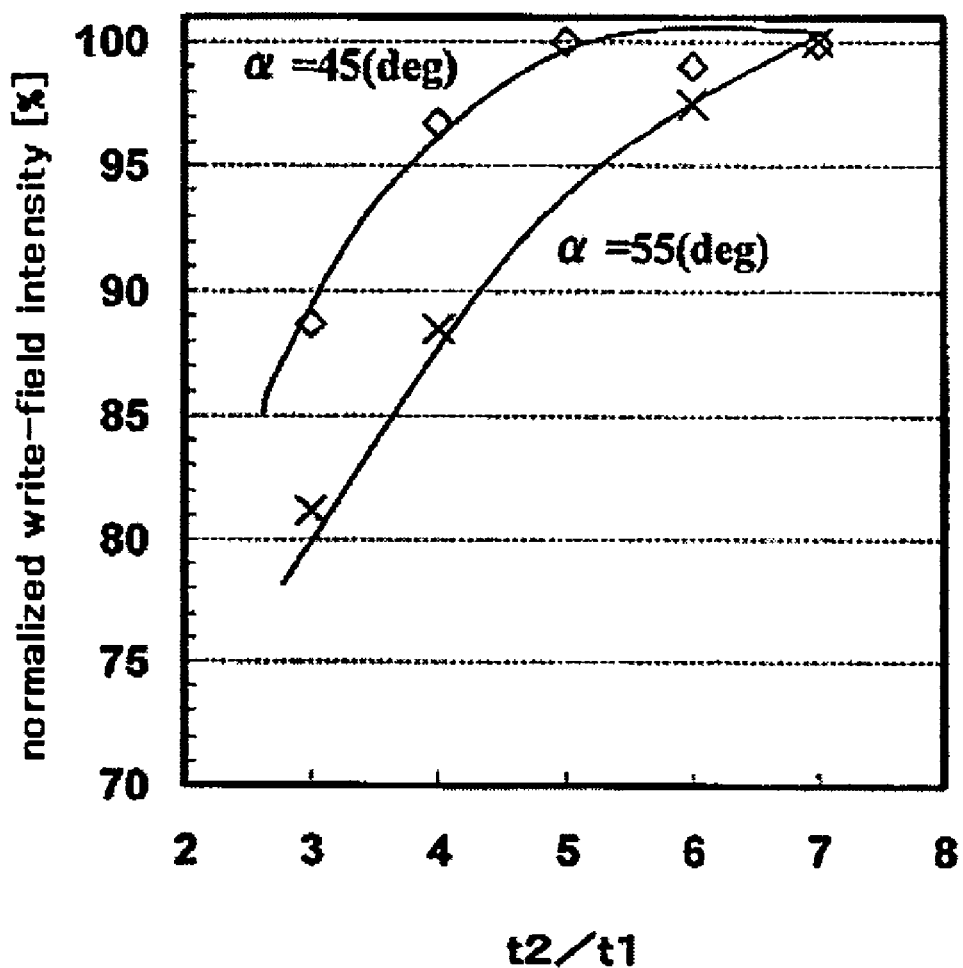
FIG. 14 is a figure showing the relationship between t2/t1 and the write-field intensity.

FIG. 14 is a figure showing the relationship between the write-field intensity and the film thickness. The horizontal axis of FIG. 14 is the ratio (t2/t1). Herein, t1 is the film thickness of the pole tip of main pole C1 exposed on the air bearing surface. And t2 is the distance along the head motion from the part connecting the pole tip of main pole 1C with the part 1B having a tapered face at the leading side to the position of the part 1B, where the slope of the tapered face has ended and it becomes perpendicular to the air bearing surface. The definitions of t1 and t2 are shown in FIG. 12. The vertical axis of FIG. 14 is normalized by the magnetic field intensity at t2/t1=8.

In this calculation, the dimensions of the pole tip of main pole 1C which provides the track width of the main pole of the magnetic head of the present invention are assumed to be 120 nm in width and 200 nm in thickness. The taper is provided from a position 100 nm which is recessed from the air bearing surface toward to the inner side in the element-height direction. The shape of the air bearing surface of the main pole is a trapezoidal shape in which the width at the trailing side is wider. That is, the width of the pole tip of main pole 1C at the leading side becomes narrower with an angle of 8° toward the leading side. Assuming CoNiFe to be the material for the main poles 1B and 1C, the saturation magnetic flux density and the relative permeability were assumed to be 2.4 T and 500, respectively. 80 at % Ni-20 at % Fe with a saturation magnetic flux density of 1.0 T is assumed for the yoke part of the main pole 1A. A material with a saturation magnetic flux density of 1.0 T is assumed for the auxiliary pole 3, and the dimensions were 30 μm wide in the track-width direction, 16 μm long in the element-height direction, and a film thickness of 2 μm. 80 at % Ni-20 at % Fe with a saturation magnetic flux density of 1.0 T is assumed for the upper shield 9 and the lower shield 8, and the dimensions were 32 μm wide in the track-width direction, 16 μm long in the element-height direction, and a film thickness 1.5 μm. CoTaZr is assumed for the material for the soft under layer 20 of the magnetic recording medium, and the distance from the air baring surface to the surface of the soft under layer 20 and the thickness of the soft under layer were 40 nm and 150 nm, respectively. The write-field intensity was calculated at the position assuming that the center position of the magnetic recording layer was a distance of 25 nm from the head air bearing surface.

The write-field intensity can be increased with increasing t2/t1, that is, by increasing t2. However, in the case when the tapered angle α of the tapered face at the leading side is 45°, an increase of the write-field intensity stops at around a t2/t1 of 5. Placing a magnetic film in an unnecessary thickness is not preferable because of deterioration in the magnetic field distribution and deformation by thermal expansion. Therefore, t2/t1≦5 is preferable in the case when the tapered angle α is 45°. In the case when the tapered angle α of the taper is 55° at the leading side, the effect of an increase in the write-field intensity can be achieved even in a film thickness whose t2/t1 is greater than 5.

These heads having the structure of the present invention have the feature that different materials can be used because the pole tip of main pole 1C exposed on the air bearing surface is fabricated by a different process from the part 1B having a tapered face at the leading side. For instance, 80 at % Ni-20 at % Fe which has a saturation magnetic flux density of 1.0 T and 45% Ni-55% Fe which has a saturation magnetic flux density of 1.7 T and a small thermal expansion coefficient are used for the part 1B having a tapered face at the leading side, and other soft magnetic films such as CoNiFe etc. which have a greater saturation magnetic flux density than those may be used for the pole tip of main pole 1C exposed on the air bearing surface.

Figure 15:
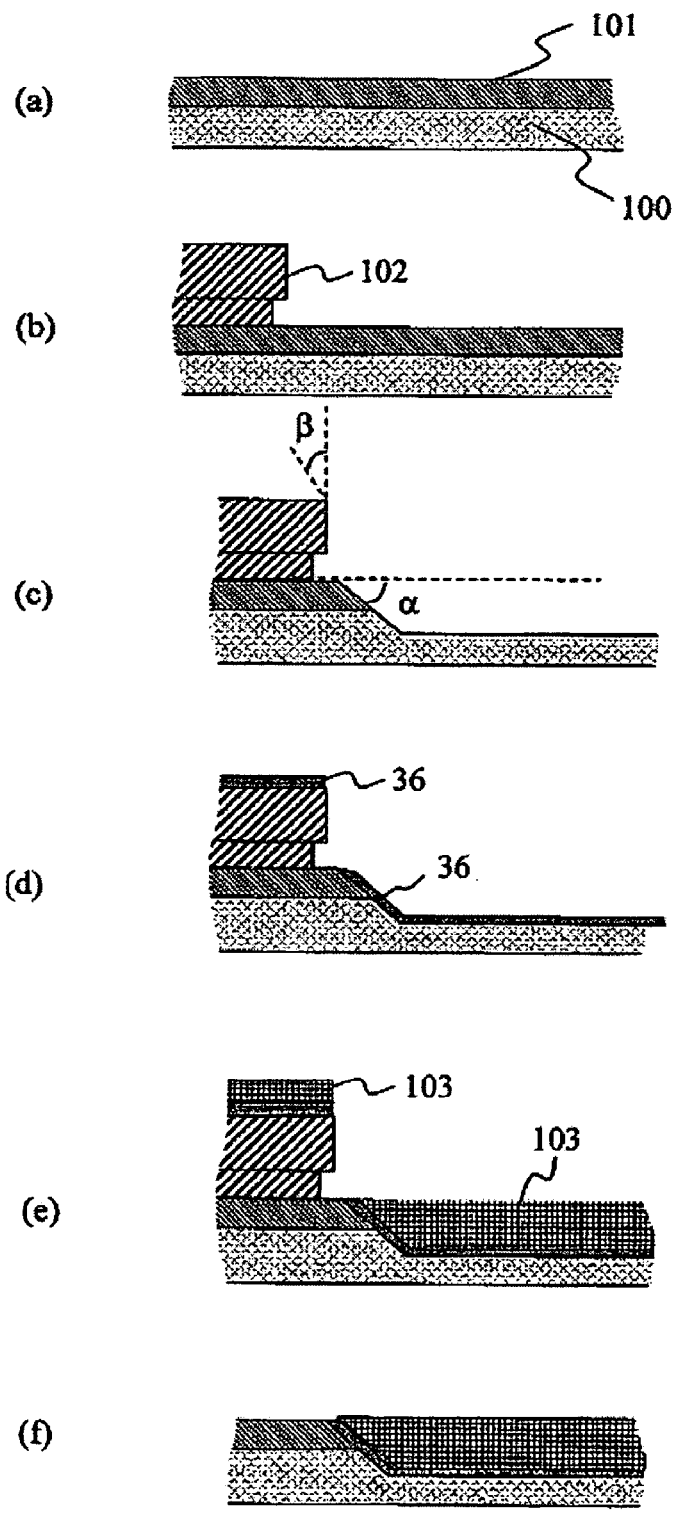
FIGS. 15(a)-(f) are figures illustrating an example of a method for manufacturing a magnetic head of the present invention.

Hereinafter, the specific embodiments of a method for fabricating a magnetic head of the present invention will be described with reference to the accompanying drawing as follows. FIG. 15 is a process chart illustrating an example of a method for fabricating a magnetic head of the present invention. The figure shows the vicinity of the air bearing surface after fabricating the yoke part 1A of the main pole. The yoke part 1A of the main pole is placed at the right side of the figure and is not illustrated. The left side of the figure is the air bearing surface side.

A magnetic film 101 is sputtered on an inorganic insulating layer 100 for the pole tip of main pole exposed on the air bearing surface of the main pole (a). Then, a lift-off pattern 102 is formed (b). Next, the magnetic film 101 is etched by an ion-milling technique (c). At this time, the tapered angle α on the side of part 1B having a tapered face at the leading side of the main pole can be formed easily by changing the ion incidence angle β with the mask of ion-milling.

Figure 16:
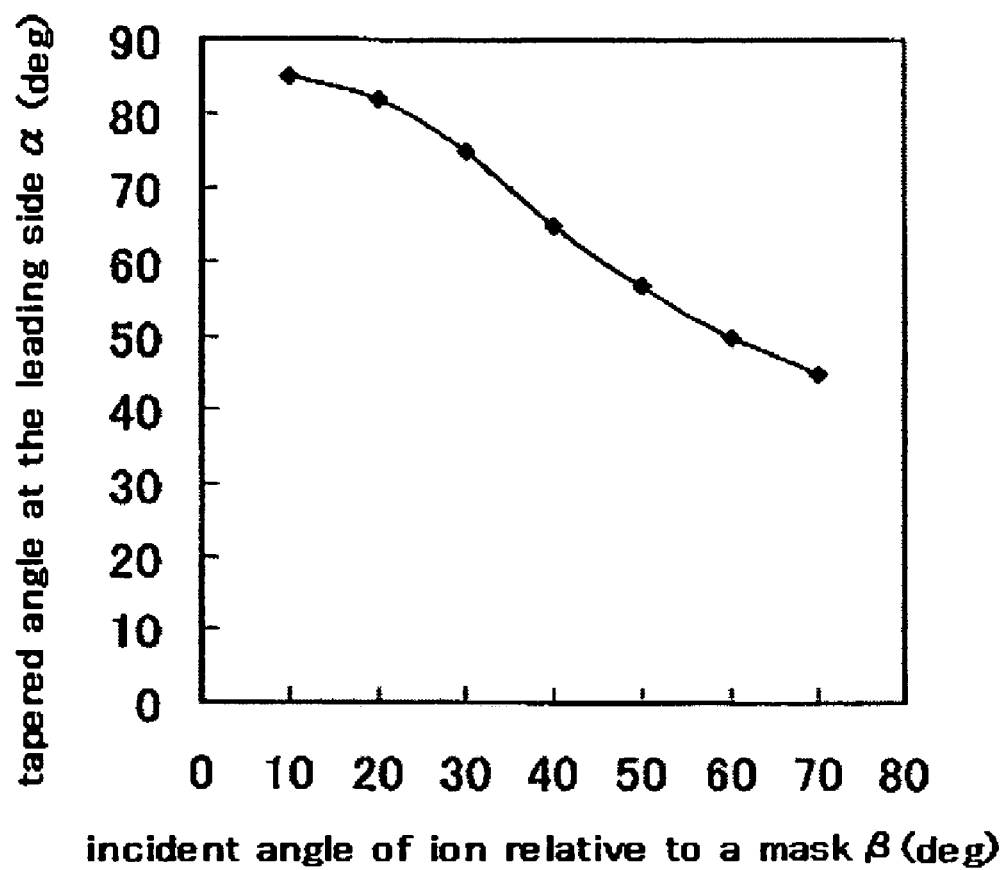
FIG. 16 is a figure showing the relationship between the ion incidence angle β and the tapered angle α.

FIG. 16 shows as an example the relationship between the ion incidence angle β and the etching angle (tapered angle α). The horizontal axis of FIG. 16 shows the ion incidence angle β with the mask of ion-milling. The vertical axis shows the tapered angle α etched in the $Al_2O_3$ film which is generally used for an inorganic insulating layer in the magnetic head. The angle α decreases with increasing the ion incidence angle β. That is, the amount of sputtering with ions becomes different between the $Al_2O_3$ film which is always exposed to ions and the $Al_2O_3$ film which is affected by the mask pattern in the vicinity of the mask pattern when the ion incidence angle β is made greater, thereby, the tapered angle α becomes smaller. It is possible to form an arbitrary tapered angle giving a difference in the processing depth by milling while controlling the ion irradiance into the work piece underneath the mask pattern.

A non-magnetic film 36 is formed before forming the magnetic film 103 on the part having a slope (taper) on the leading side of the main pole by a sputtering technique (d). Moreover, as the next process, the magnetic film 103 of the part 1B which has a tapered face at the leading side of the main pole is formed by a sputtering technique (e). Here, the magnetic film 103 may consist of a plurality of materials. Then, the lift-off pattern is removed (f). According to the above-mentioned processes, the main pole structure of the present invention shown in FIG. 3 is obtained. The process for forming the non-magnetic film 36 before forming the magnetic film 103 by sputtering for the part 1B which has a tapered face at the leading side of the main pole may be omitted. If the process for forming the non-magnetic film 36 is omitted, the main pole structure of the present invention shown in FIG. 1 is obtained.

Figure 17:
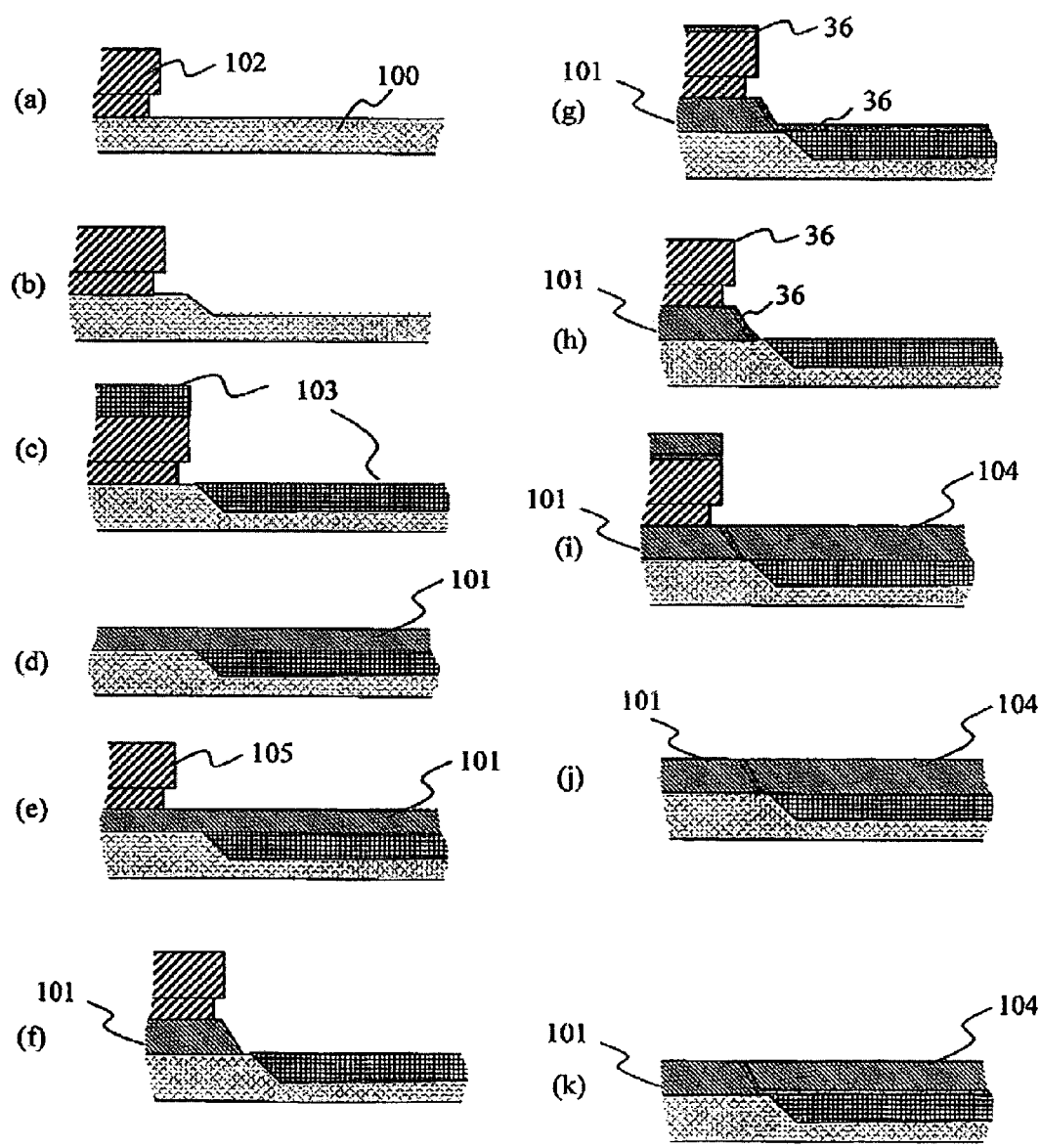
FIGS. 17(a)-(k) are figures illustrating another example of a method for fabricating a magnetic head of the present invention.

FIG. 17 is a process chart illustrating another example of a method for fabricating a magnetic head of the present invention. The figure shows the vicinity of the air bearing surface after fabricating the yoke part 1A of the main pole. The yoke part 1A of the main pole is placed at the right side of the figure and is not illustrated. The left side of the figure is the air bearing surface side.

A lift-off pattern 102 is formed on the inorganic insulating layer 100 (a). Next, the inorganic insulating layer 100 is etched by ion-milling (b). At this time, in a manner similar to the above-mentioned embodiment the etched shape, that is, the tapered angle of the part 1B which has a tapered face at the leading side of the main pole can be changed by changing the milling condition. Then, the magnetic film 103 for the part 1B which has a tapered face at the leading side of the main pole is formed by sputtering (c). After removing the lift-off pattern 102 and the magnetic film 101 sputtered on top of it, a process for planarizing is carried out. Then, the magnetic film 101 for the pole tip of main pole 1C exposed on the air bearing surface of the main pole is sputtered (d). If the process is stopped here, a main pole structure without a non-magnetic layer can be obtained.

It then moves on to the following process to form the non-magnetic layer between the pole tip of main pole 1C and the upper part. The lift-off pattern 105 is formed on the magnetic film 101 (e), and the magnetic film 101 is etched by ion-milling (f). Then, the non-magnetic film 36 is formed (g). And the non-magnetic layer on top of the magnetic layer 103 is removed by ion-milling (h). After that, the magnetic layer 104 is formed (i), the lift-off pattern 105 is removed, and the head having the structure of the present invention can be obtained (j). The magnetic layers 101 and 104 may be composed of the same material and of different materials. Moreover, after the process (f), the surface of the magnetic layer may be oxidized to form a non-magnetic layer composed of a surface oxidized layer.

Moreover, the process (h) for removing the non-magnetic layer on the magnetic layer 103 may be omitted. In this case, a head structure such as (k) can be obtained, in which a non-magnetic layer also exists between the magnetic layers 103 and 104.

Figure 18:
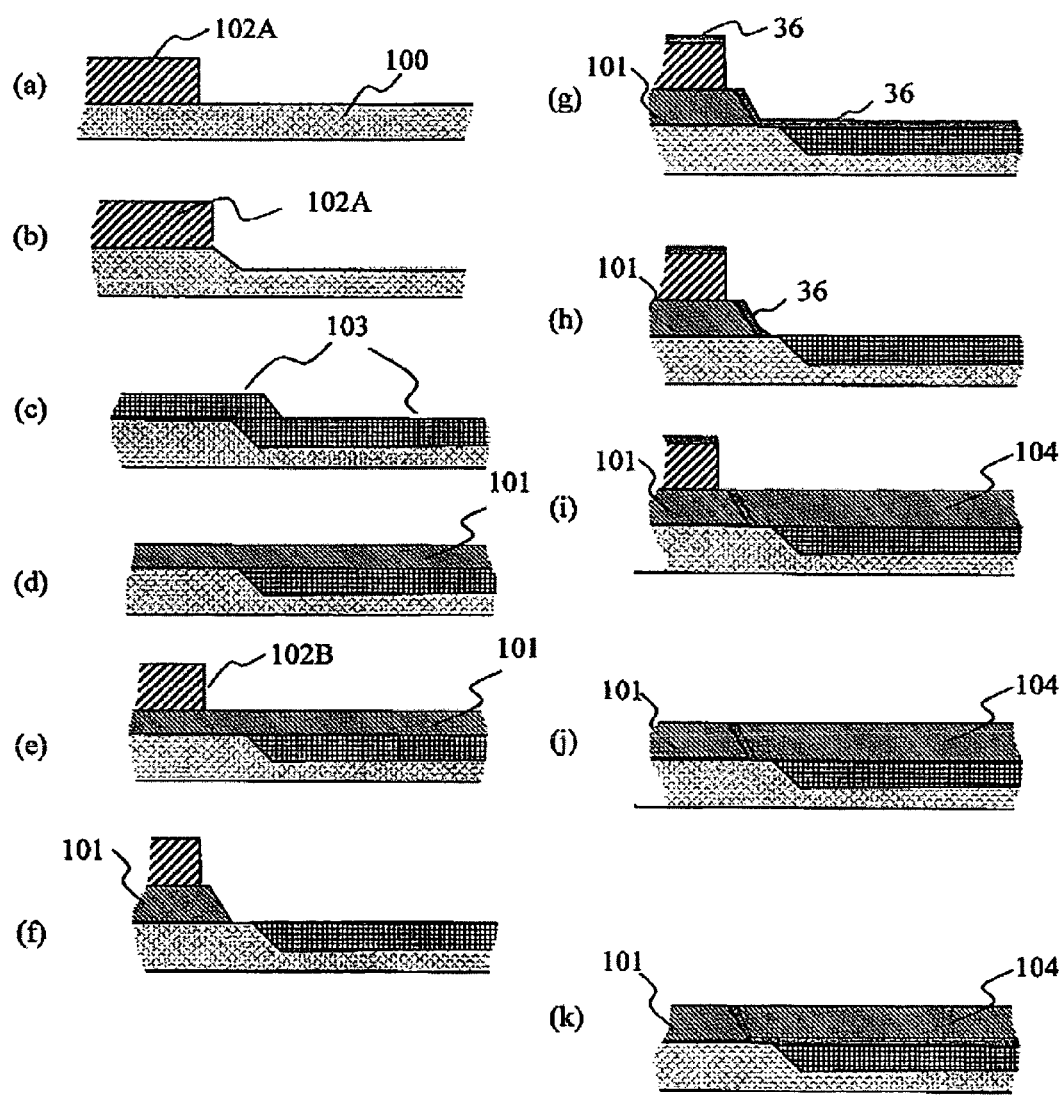
FIGS. 18(a)-(k) are figures illustrating another example of a method for fabricating a magnetic head of the present invention.
Figure 19:
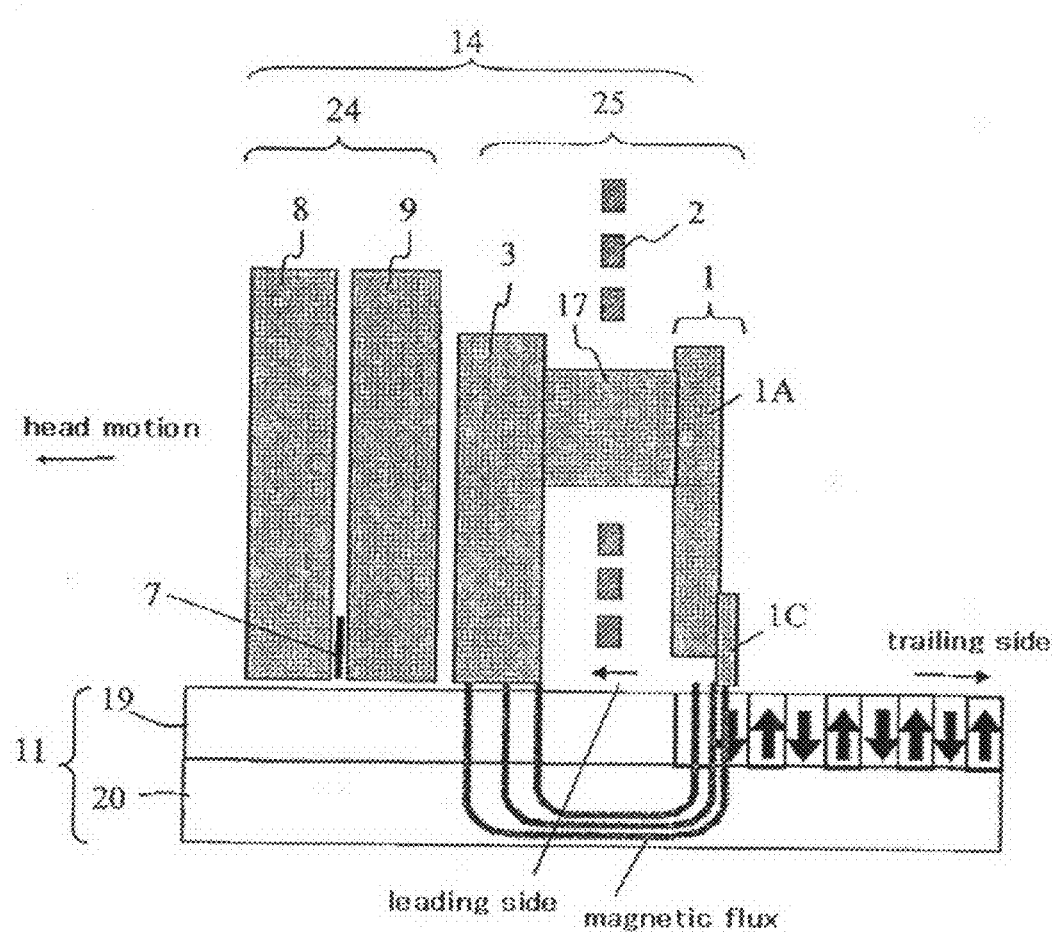
FIG. 19 is a schematic explanatory drawing of a perpendicular recording using a conventional magnetic head.
Figure 20:
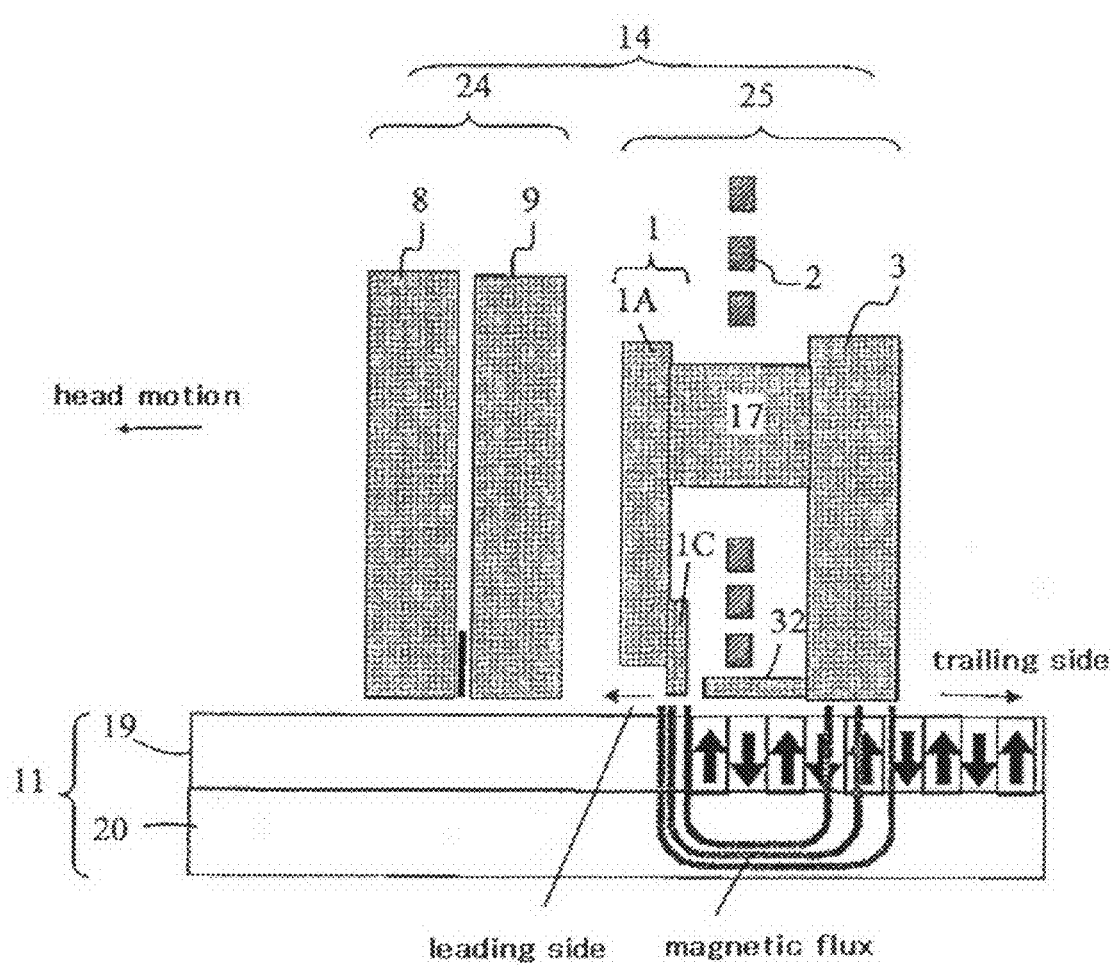
FIG. 20 is a schematic drawing illustrating another example of a magnetic head.

FIG. 18 is a process chart illustrating an example of a method for fabricating a magnetic head of the present invention without using a lift-off pattern. The figure shows the vicinity of the air bearing surface after fabricating the yoke part 1A of the main pole. The yoke part 1A of the main pole is placed at the right side of figure and is not illustrated. The right side of the figure is the air bearing surface side.

A mask pattern 102A is formed on the inorganic insulating layer 100 (a). Next, the inorganic insulating layer 100 is etched by ion-milling (b). At this time, a tapered angle of the part 1B which has a tapered face at the leading side of the main pole is formed by using the method described above. After removing the mask pattern 102A, the magnetic film 103 for the part 1B which has a tapered face at the leading side of the main pole is formed by sputtering the magnetic film 103 (c). Next, the unnecessary magnetic film 103 is removed by the process for planarizing. Then, the magnetic film 101 is sputtered for the pole tip of main pole 1C exposed on the air bearing surface of the main pole (d). If the process is stopped here, a structure without a non-magnetic layer can be obtained.

It then moves on to the following process to form the non-magnetic layer between the pole tip of main pole 1C and the upper part. The mask pattern 102B is formed on the magnetic film 101 (e), and the magnetic film 101 is etched by ion-milling (f). The, the non-magnetic film 36 is formed (g). And the non-magnetic layer on top of the magnetic layer 103 is removed by ion-milling (h). After that, the magnetic layer 104 is formed (i), the mask pattern 102B is removed, and the head having the structure of the present invention can be obtained (j). The magnetic layers 101 and 104 may be composed of the same material and of different materials. Moreover, after the process (f), the surface of the magnetic layer may be oxidized to form a non-magnetic layer composed of a surface oxidized layer.

Moreover, the process (h) for removing the non-magnetic layer on the magnetic layer 103 may be omitted. In this case, a head structure such as (k) can be obtained, in which a non-magnetic layer also exists between the magnetic layers 103 and 104.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head for a perpendicular recording system comprising a main pole and an auxiliary pole, the magnetic head having an element-height direction and a track-width direction, and a leading side and a trailing side, wherein
said main pole has a yoke part and a pole tip, wherein said pole tip is separately formed from said yoke part,
said pole tip includes a first section having a predetermined film thickness in which the tip is exposed at an air bearing surface, and a second section which is located above said first section in a back part of the element-height direction and has an area where a face at the leading side is inclined against the air bearing surface and the film thickness is gradually increased toward the back part of the element-height direction,
wherein said first section comprises a different material than said second section.

2. A magnetic head according to claim 1, wherein said second section has a shape in which the width in the track-width direction extends continuously toward the back part of the element-height direction.

3. A magnetic head according to claim 1, wherein a non-magnetic layer is provided between said first section and second section.

4. A magnetic head according to claim 3, wherein the height of said first section in the element-height direction is less than the width of said first section in the track-width direction exposed on the air bearing surface.

5. A magnetic head according to claim 3, wherein said first section and second section are composed of different magnetic materials.

* * * * *